United States Patent [19]

Moore et al.

[11] Patent Number: 4,511,431

[45] Date of Patent: Apr. 16, 1985

[54] PROCESS FOR EVAPORATIVE STRIPPING

[75] Inventors: James G. Moore; James H. Obey, both of Williamsville; Edward B. Pinkel, Angola, all of N.Y.

[73] Assignee: White Consolidated Industries, Inc., Cleveland, Ohio

[21] Appl. No.: 385,322

[22] Filed: Jun. 4, 1982

[51] Int. Cl.³ .................... B01D 1/00; B01D 1/16; B01D 1/30; F28F 3/08

[52] U.S. Cl. .................. 159/47.1; 159/48.2; 159/DIG. 2; 165/167

[58] Field of Search .............. 159/2 R, 13 R, 28 P, 159/47.1, 48.2, 49, DIG. 2; 165/167

[56] References Cited

U.S. PATENT DOCUMENTS

| | | | |
|---|---|---|---|
| 2,562,739 | 7/1951 | Risberg | 159/28 P |
| 3,073,380 | 1/1963 | Palmason | 159/49 |
| 3,155,565 | 11/1964 | Goodman | 159/49 |
| 3,469,617 | 9/1969 | Palmason | . |
| 3,509,932 | 5/1970 | Chambers | 159/13 R |
| 3,656,534 | 4/1972 | Bain et al. | 159/28 P |
| 3,735,793 | 5/1973 | Burberry et al. | 159/13 R |
| 3,759,308 | 9/1973 | Gebauer | 159/13 R |
| 3,984,281 | 10/1976 | Buchwald | 159/28 P |
| 4,153,501 | 5/1979 | Fink et al. | 159/49 |
| 4,346,560 | 8/1982 | Rapier | . |

FOREIGN PATENT DOCUMENTS

| | | | |
|---|---|---|---|
| 2121963 | 12/1971 | Fed. Rep. of Germany | . |
| 2606612 | 8/1977 | Fed. Rep. of Germany | . |
| 39375 | 3/1979 | Japan | 159/13 R |
| 935542 | 8/1963 | United Kingdom | . |

Primary Examiner—Bradley Garris
Attorney, Agent, or Firm—Mandeville & Schweitzer

[57] ABSTRACT

Liquid material is heated within a first predetermined portion of a confined passageway under pressure and temperature conditions whereby the volatile components of the liquid material are maintained below the boiling point for said volatile components. The heated liquid material is continuously passed from said first predetermined portion into and through a second predetermined portion of the confined passageway which is arranged to form a partial restriction to fluid flow. The liquid material is immediately passed from the partial restriction into a third predetermined portion of the confined passageway which is arranged and configured to provide a relatively elongated, narrow passage having a high ratio of surface area to volume of fluid flow and a predetermined configuration to impart a turbulent flow to the liquid material. The pressure and velocity conditions of the fluid flow within the third predetermined portion are maintained at pre-selected levels whereby the volatile components of the liquid material rapidly vaporize in a flashing action as the liquid material passes from the first predetermined portion of the confined passageway through the partial restriction formed by the second predetermined portion of the confined passageway and into the third predetermined portion of the confined passageway whereby the vaporized volatile components form a high velocity vapor flow carrying the liquid material in atomized droplet form.

13 Claims, 9 Drawing Figures

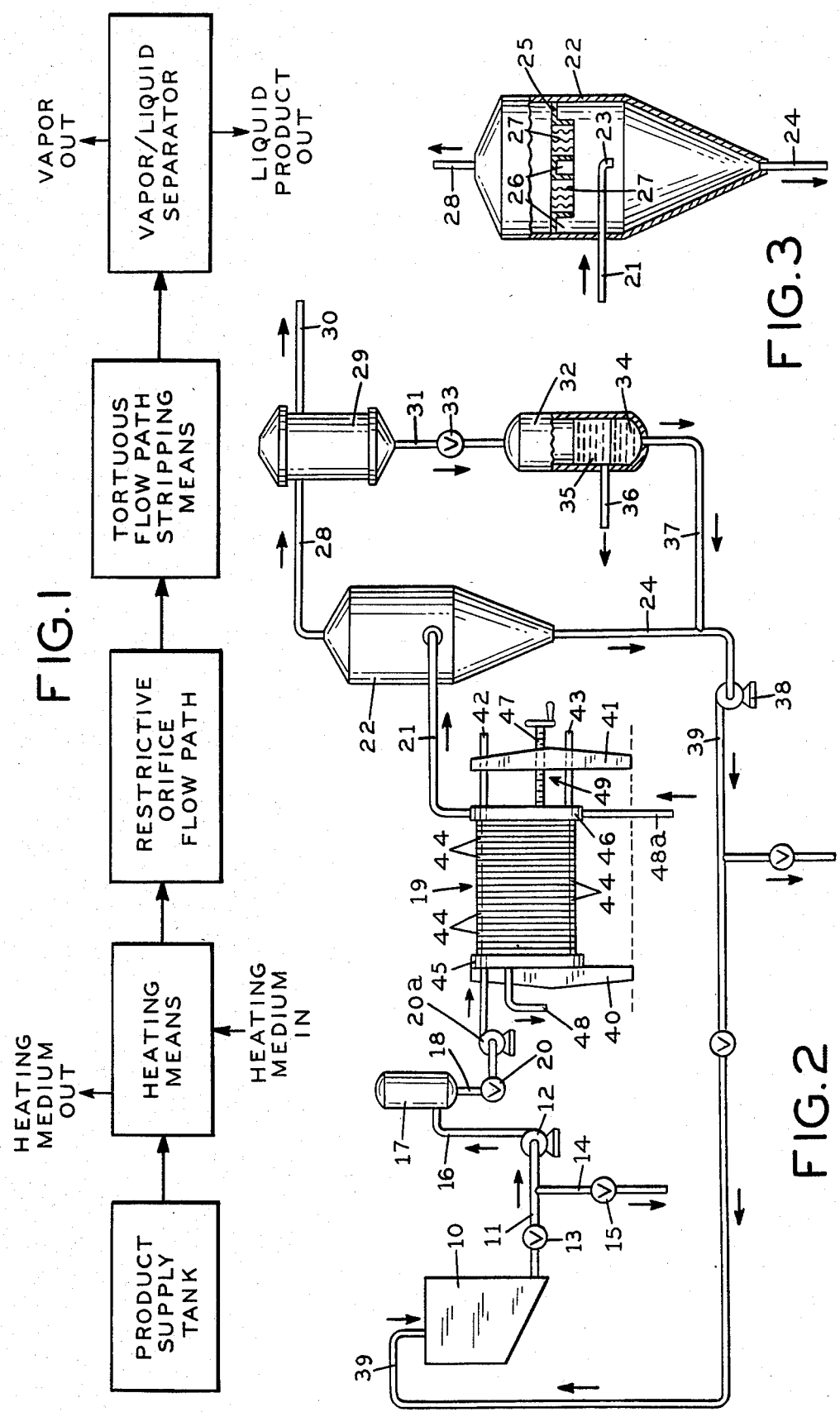

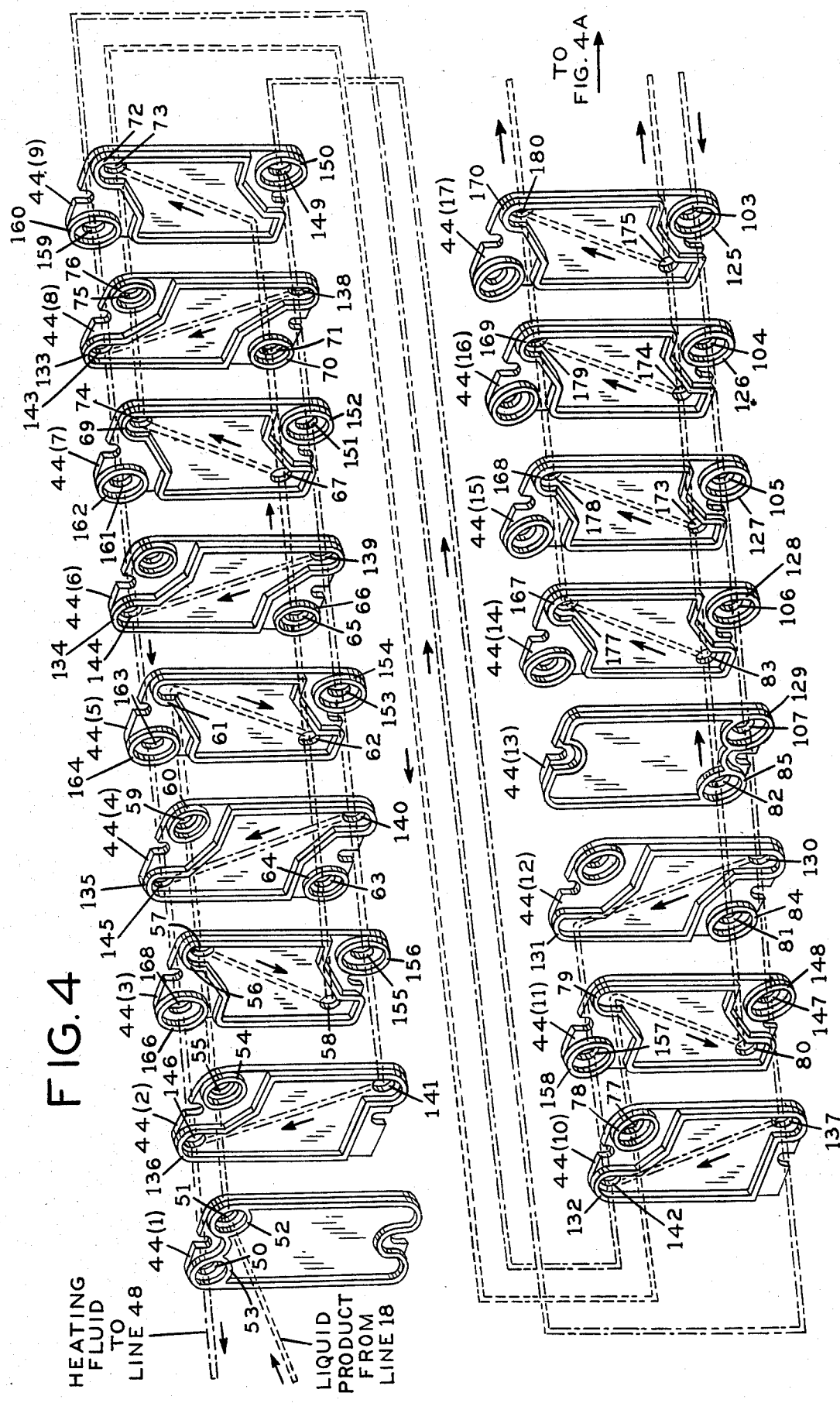

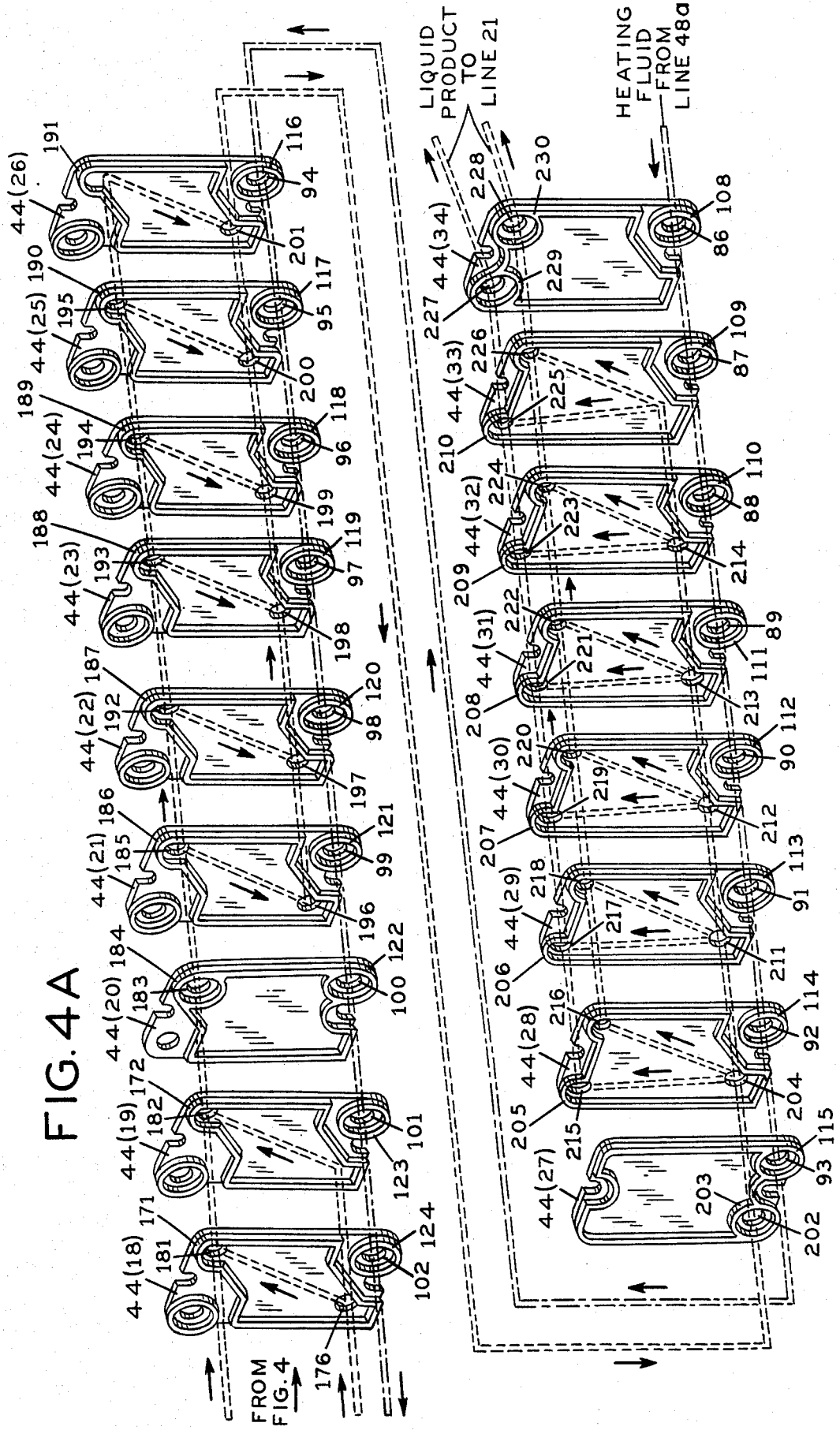

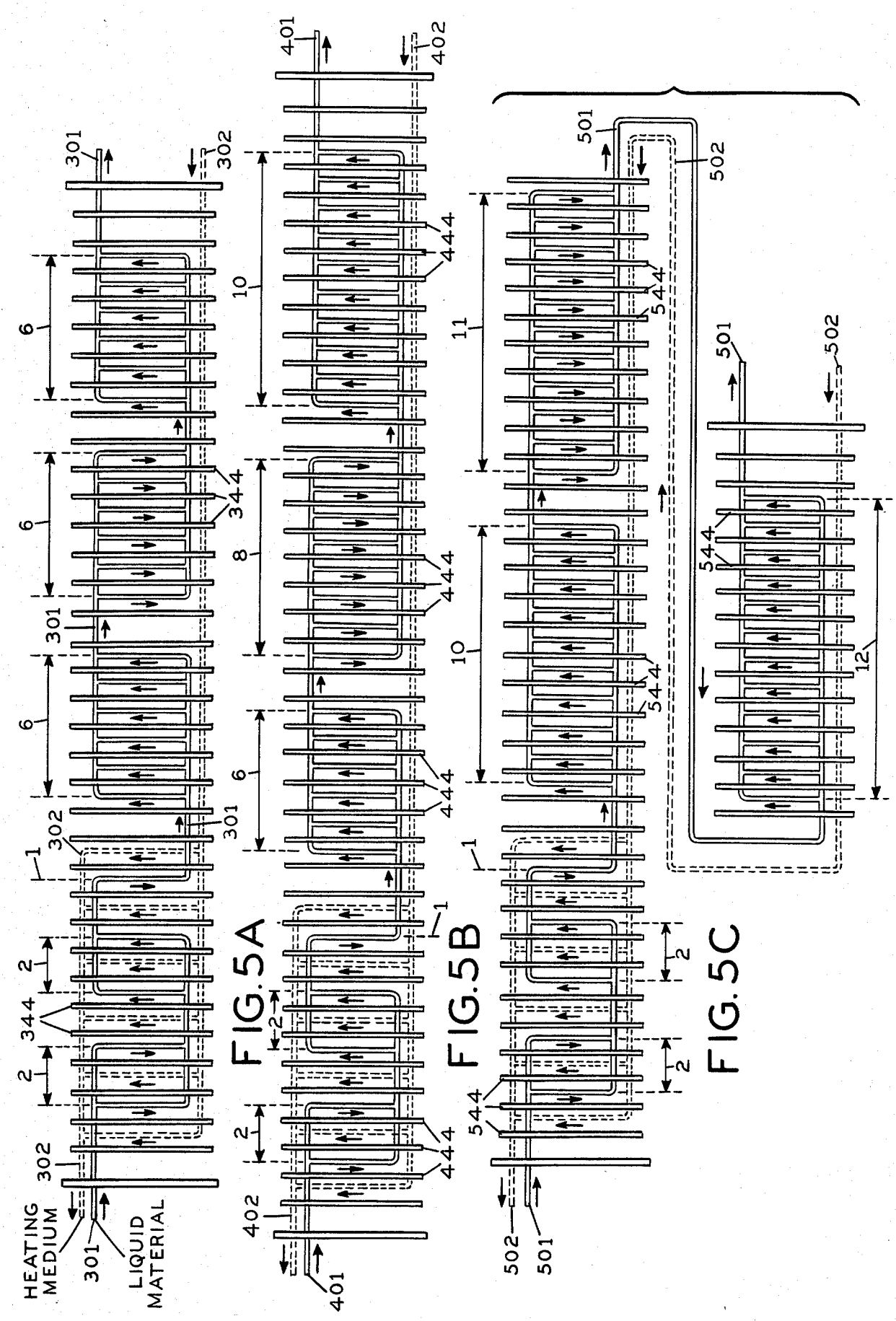

PROCESS FOR EVAPORATIVE STRIPPING

BACKGROUND AND SUMMARY OF THE INVENTION

The present invention is directed to a new and improved method and apparatus for removing volatile components from liquid materials, especially liquid materials which have foaming characteristics, are heat-sensitive, or both.

In the chemical, food, pharmaceutical and other industries, it is often necessary to strip or evaporate certain volatile components from a liquid material to obtain a final commercial product. For example, solvents and/or monomers used in an efficient process for manufacturing a chemical product must be removed from the product at the end of the chemical process. Of course, any commercially acceptable evaporation process must remove the volatile components from the liquid product as efficiently as possible with little or no deleterious effects upon the final concentrated liquid. In the case of heat-sensitive, foam-forming liquids, the evaporation process becomes of critical importance in that the liquid must be efficiently concentrated to commercially acceptable levels with little or no foaming (which creates practical problems in handling the material) and with heat applications to the liquid which will not damage the heat-sensitive product.

Typically, volatile components are evaporated from a liquid material in accordance with the well known batch vessel process. Pursuant to the batch vessel process, the liquid material is placed in a large generally cylindrical vessel which includes a steam pipe extending into the interior of the vessel. The steam pipe is provided with steam outlet means submerged in the liquid material whereby steam may be continuously injected into the liquid material. The steam will flow through the material and rise to the top of the vessel. As the steam flows through the liquid material it will heat and evaporate the volatile components contained in the liquid material. The rising steam and evaporated components are collected and removed from the top of the vessel. In order to strip the volatile components from the liquid material whereby less than 0.2% of the volatile components remain in the final liquid product, it is necessary to leave the liquid product in the vessel, exposed to continuous steam flow for a period of between 20 to 24 hours. Consequently, the prior art batch vessel process is inefficient in that it requires a substantial amount of time to effectively strip volatile components from a liquid product. Moreover, the liquid material generally sustains some damage by virtue of being exposed to a constant steam flow for a substantial length of time. This is especially true in the processing of heat-sensitive liquids.

As a consequence of the special problems associated with heat-sensitive liquid products, those skilled in the art have sought to develop improved evaporation techniques ideally suited to such products. One prior art solution, disclosed in U.S. Pat. No. 3,073,380, comprises the steps of passing the material to be concentrated through a heated tortuous flow path of relatively narrow elongated cross-section at a high velocity. The flow path is arranged such that the value of the heat exchange areas of the flow path as measured in square feet far exceeds the value of the volume of liquid flowing through the flow path as measured in cubic feet. Pursuant to the process, sufficient heat is applied to the liquid path to vaporize the volatile components of the liquid as the liquid flows through the path to form a homogeneous mixture of concentrated liquid and vapor. The flow of the homogeneous mixture is continued through the tortuous path while additional heat is added to the mixture.

As indicated in U.S. Pat. No. 3,073,380, the disclosed tortuous flow path induces a turbulent flow of the material to achieve an excellent heat transfer thereby raising the temperature of the liquid rapidly to the point where vaporization of the volatile components occurs. The abrupt changes of flow direction caused by the tortuous flow path and the high velocity of the fluid flow cause a high degree of evaporation. Moreover, in the case of foam-forming liquids, such evaporation occurs without foaming. The material leaves the tortuous flow path as a concentrated liquid carried in homogeneous mixture by the vapors formed in the process. Moreover, inasmuch as vapor is generated continuously within the tortuous flow path, sensible heat is continuously converted to latent heat of vaporization to thereby reduce the temperature of the product, and avoid damage to the heat-sensitive liquid material.

While the disclosure of the above-discussed U.S. Pat. No. 3,073,380 provided the art with a significant advance for concentrating heat-sensitive and foam-forming liquid products, the method disclosed was not entirely satisfactory for stripping volatile components from a liquid material whereby only very small quantities of the volatile component remain in the liquid after processing. To that end, U.S. Pat. No. 3,469,617 disclosed an improvement of the method covered by the earlier patent. More particularly, the U.S. Pat. No. 3,469,617 patent proposed initiating a high velocity continuous phase of stripping vapor flow, e.g., steam, through the tortuous flow path and adding to the vapor flow immediately upstream from the inlet port to the tortuous flow path the material to be stripped in an appropriate weight proportion to the vapor. The tortuous flow path induces a turbulent flow causing new surfaces of the liquid material to be continuously exposed to contact with the stripping gas of the vapor phase to thereby continuously strip volatile substances from the liquid material.

Pursuant to the process of U.S. Pat. No. 3,469,617, the vapor flow is used to form a continuum for the liquid material to be stripped and as the source of heat for the stripping process. This is in contrast to the earlier discussed U.S. patent wherein the vapor continuum is gradually formed by the vaporization of the volatile components of the liquid material and heat is applied by external means. The use of a continuous vapor phase from an outside source which is combined with the liquid material prior to passage through the tortuous flow path greatly increased the amount of vaporization occurring in the volatile components of the liquid material, thus achieving a stripping action to substantially eliminate such volatile components from the liquid product. However, a disadvantage of the proposed method disclosed in U.S. Pat. No. 3,469,617 is that the use of a vapor continuum requires additional apparatus structure to provide and transport the stripping gas to the tortuous flow path as well as special vapor inlet pipes to properly mix the incoming stripping gas and liquid to be stripped. The introduction of hot gas directly into the liquid material at the inlet pipe results in local overheating which may adversely effect product quality. Moreover, the overall capacity of the tortuous flow path must be sufficient to accommodate the additional volume requirements of using a stripping gas from an outside source which is mixed with the liquid product prior to ingress of the resulting mixture into the tortuous flow path.

From the foregoing, it should be understood that while those skilled in the art have provided means for concentrating liquid materials and stripping volatile components from such products, certain disadvantages are inherent in the prior proposals. More specifically, the batch vessel process is inefficient timewise and generally unsuitable for delicate liquid products. The earlier proposal of U.S. Pat. No. 3,073,380 while providing an excellent means for concentrating delicate liquid materials, was not suitable for a stripping operation. The vapor continuum was formed solely by gradual vaporization of the volatile components of the liquid material throughout the flow path and therefore sufficient volume for the vapor phase as required in a stripping operation could not be readily achieved. As discussed above, the process of the later U.S. Pat. No. 3,469,617 improved the efficacy of the method disclosed by the earlier patent, however, not without the need of additional apparatus structure, increased volume requirements for the tortuous flow path and localized heating of the liquid flow.

It is a primary objective of the present invention to provide a new and improved process and apparatus for evaporating volatile components from a liquid material which retains the advantages of the earlier proposals while eliminating the disadvantages. Generally, the invention comprises the steps of passing the liquid product to be stripped or concentrated through a heating means in which sufficient heat is added to the liquid to achieve vaporization of the volatile components, yet maintaining the pressure, volume and velocity conditions of the liquid within the heating means at predetermined levels such that no vaporization occurs while the liquid is passing through the heating means. Thereafter the heated liquid product is passed through a restrictive orifice-forming flow path into a tortuous flow path stripping section. The restrictive orifice-forming flow path is arranged to maintain the proper pressure conditions within the heating means to prevent any vaporization from occurring therein. Moreover, the volume, pressure and velocity conditions within the tortuous flow path stripping section are maintained at certain predetermined levels such that relative to the conditions existing within the restrictive orifice-forming flow path, the heated liquid product will "flash" as it flows from the restrictive orifice-forming flow path into the tortuous flow path stripping section. The flashing action brought about by the relatively larger volume due to pressure differences will cause rapid vaporization of the heated volatile components to rapidly form a vapor continuum flowing at an extremely high velocity. The vaporization being caused by a pressure drop will occur at relatively low temperatures to greatly minimize the possibility of a local overheating of the liquid material. The vapor continuum will carry the liquid in atomized droplet form.

Pursuant to a significant feature of the invention, the tortuous flow path stripping section is of a relatively narrow elongated cross section with a high ratio of surface area to volume of fluid flow. Thus, inasmuch as the overall volume of the stripping section is much greater than the volume of the restrictive orifice-forming flow path to effect flashing, the fluid flow will be turbulent facilitating a rapid vaporization of the volatile components to form a vapor phase continuum. Moreover, the vapor phase continuum formed pursuant to the process steps of the invention will act to essentially atomize the liquid into droplets suspended in the vapor phase. Each droplet will be turbulently moved through the flow path to provide a high degree of exposure of each droplet to the vapor whereby the remaining volatile components are evaporated from the droplet. The fluid flow leaving the tortuous flow path stripping section will be in the form of a high velocity vapor spray including finely atomized droplets of liquid substantially stripped of volatile components. This exiting fluid flow may be passed into a separator wherein the finely atomized liquid droplets will condense and collect at the bottom of the separator apparatus while the vapor phase rises to and is removed from the top portions of the separator.

It has been found that the process according to the present invention may be carried out in a most effective and economical manner by utilizing a novel arrangement of a plate-type evaporator including multiple fluid passes with each pass having a relatively high pass surface area to enclosed volume ratio. Pursuant to a feature of the apparatus aspects of the inventive concept, the several fluid passes of the plate-type evaporator are arranged into three functional sections. The first section will operate as the heating unit and includes several heated passes through which the fluid is passed. The fluid is heated to a temperature below the boiling point of the volatile components to be removed at the existing pressure conditions within the first section of the plate-type evaporator. The second section will operate as the tortuous flow path stripping section and comprises most of the remaining passes of the plate-type evaporator. Generally, these passes will be unheated except that under certain circumstances some controlled heating of the stripping section may be used to maintain adiabatic conditions within the stripping section without the introduction of direct, live steam. The number of fluid passes within the stripping section will usually exceed the number of passes in the first heated section to permit the necessary volume expansion of the heated liquid as it flows from the heated section to the stripping section to obtain flashing of the liquid and vaporization of the volatile components. In the plate-type evaporator embodiment of the invention, a predetermined number of passes, typically one, are arranged between the heated section and stripping section to act as the restrictive orifice-forming flow path to maintain the proper pressure conditions within the heated section and to provide the necessary structure to cause a flashing of the liquid as it flows from the heated section to the stripping section.

While it is most convenient and economical to utilize the first several passes of a plate-type evaporator as the heated section, any type of suitable pre-heater of tubular or similar construction may be used as the heating means of the process. Such a pre-heater unit will be arranged upstream from the plate-type stripping section of the evaporator whereby the liquid product will flow into the pre-heater for proper heating and immediately thereafter flow into the inlet port of the plate-type stripping section of the evaporator for stripping, as discussed above. Of course, in all instances, a constriction of fluid flow must be provided between the pre-heater and the plate-type evaporator to maintain the proper pressure conditions within the pre-heater and to effect the flashing of the liquid product into the plate-type evaporator. It should be noted that the tortuous flow path stripping section may comprise, as an alternative to the plate-type evaporator, any structure arranged to induce a turbulent fluid flow as the liquid product is flashed from the heating means. For example, the fluid may be passed into an axially elongated tube including an internal corrugated metal structure to substantially occupy the internal spaces of the tube to define a plurality of narrow, elongated, turn-inducing flow paths for the fluid flow.

The present invention provides the art with a significant improvement by teaching a novel means and apparatus for effectively removing volatile components from a liquid product with a controlled heat application sufficient to bring about vaporization of the volatile components without damaging the liquid. The process contemplates a high velocity for the liquid whereby the liquid is exposed to the heating section for a minimal amount of time and immediately flows into the stripping section whereby the added heat is quickly converted to latent heat of vaporization. Moreover, the flashing aspects of the process being about rapid vaporization of the volatile components to form an atomized spray with the liquid being suspended in the vapor continuum formed by the vaporized components in atomized droplet form. The atomized spray continues to flow through the tortuous flow path whereby the droplets undergo further stripping. The sequence of steps taught by the present invention achieves excellent results within a straightforward, space-saving apparatus structure and without the need of a stripping gas, such as steam or the addition of heat to the stripping section. The more specific features of the invention will be determined by the particular characteristics of the liquid product, the degree of stripping or evaporation of volatile components desired as well as the sheer tolerance, thermal stability and foaming characteristics of the liquid material in process, as will appear.

For a better understanding of the above and other features and advantages of the present invention, reference should be made to the following detailed description of preferred embodiments of the invention, results of test runs of the process, and the accompanying drawings.

BRIEF DESCRIPTION OF THE DRAWINGS

FIG. 1 is a block diagram of the process for evaporating volatile components according to the present invention.

FIG. 2 is a typical arrangement for a system incorporating the principles of the present invention and showing a feed tank, a plate-type evaporator, a separator and a decanter.

FIG. 3 is a side view in cross section of the separator of FIG. 1.

FIGS. 4 and 4A together provide a diagrammatic exploded view of the plates of the plate-type evaporator of FIG. 1.

FIGS. 5a, b, and c illustrate in schematic form several preferred pass arrangements for the plate-type evaporator of the present invention.

DETAILED DESCRIPTION OF PREFERRED EMBODIMENTS OF THE INVENTION

Figure 6:
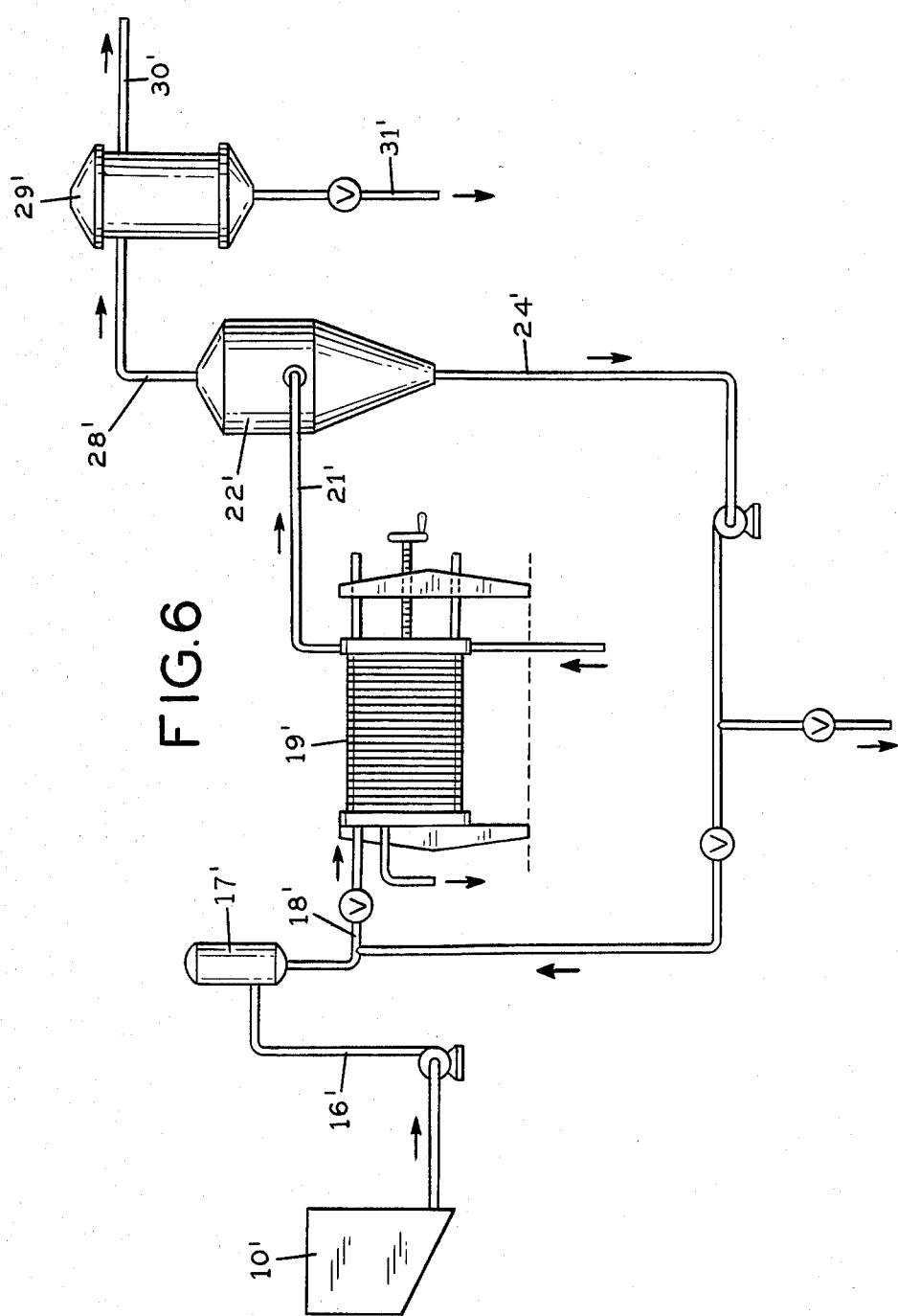
FIG. 6 illustrates an alternative arrangement for a system incorporating the teachings of the present invention.

Referring now to the drawings and initially to FIG. 1 thereof, there is illustrated in schematic form the steps of the process for evaporating volatile components according to the teachings of the present invention. The liquid product to be processed is initially contained within a product supply tank and allowed to flow therefrom directly into a heating means. A suitable heating medium, e.g., steam or hot oil, is applied to the heating means whereby the temperature of the liquid is raised to a point at which the liquid contains sufficient heat to achieve vaporization of the volatile components to be removed. The pressure, volume and velocity conditions of the liquid as it flows through the heating means are maintained at predetermined levels whereby no vaporization of the volatile components occurs within the heating means. The heated liquid is then passed through a restrictive orifice flow path into a tortuous flow path stripping means. The restrictive orifice flow path forms a constriction between the heating means and the tortuous flow path stripping means to maintain the required predetermined pressure levels within the heating means and to produce a flashing of the heated liquid as it passes from the heating means into the tortuous flow path stripping means. As discussed above, the tortuous flow path stripping means comprises a fluid conduit defining a flow path of relatively narrow elongated cross section with a high ratio of surface area to volume of fluid flow.

It should be understood that the volume, pressure and velocity conditions maintained within the tortuous flow path stripping means are set at predetermined levels relative to the corresponding conditions existing within the heating means to facilitate the flashing of the liquid as it passes from the restrictive orifice flow path into the tortuous flow path stripping means. This will foster the vaporization of the volatile components of the liquid as the liquid flashes into the tortuous flow path stripping means. Moreover, the above-described configuration of the fluid conduit comprising the tortuous flow path stripping means induces a turbulent flow to bring about a rapid vaporization of the volatile components to form a vapor phase continuum. The vapor phase continuum formed by virtue of the steps of the invention will essentially atomize the liquid product into fine droplets suspended in the vapor phase. The droplets will continue in a turbulent flow through the remaining portions of the tortuous flow path stripping means causing each droplet to be subjected to a high degree of exposure to the vapor phase continuum whereby a substantial portion of the volatile components contained within each droplet is evaporated from the droplet. At the exit of the tortuous flow path stripping means, the fluid flow will be in the form of a high velocity vapor spray including finely atomized droplets of liquid substantially stripped of volatile components. Pursuant to the invention, the flow leaving the tortuous flow path stripping means is directed into a vapor liquid separator wherein the stripped liquid product is separated from the vapor phase continuum. The process of the invention may be used to strip volatile components from a liquid product whereby a very minute fraction, e.g., less than 0.2% of the volatile component remains in the final liquid product. Alternatively, the process of the invention may be used to remove substantial quantities of volatile components to effectively concentrate a solid content from, e.g., an original 10% by weight solid to a final 60% by weight solid.

A preferred form for a system for practicing the steps of the process of the invention is illustrated in FIG. 2. The system includes a product supply tank 10 which feeds a liquid material to be stripped through a line 11 to a feed pump 12. The line 11 includes a control valve 13. The line 11 is in fluid communication with an output line 14 including a control valve 15. As will appear, the system illustrated in FIG. 2 may be operated as a batch recycle system wherein the liquid is continuously fed back to the product supply tank for subsequent passes through the evaporative stripping steps to achieve a high degree of stripping. At the conclusion of the stripping process, the final stripped liquid may be returned to the supply tank. At this time, the valves 13 and 15 are opened whereby the liquid will be drawn out of the supply tank through lines 11 and 14 for removal from the system. Ordinarily, the control valve 15 is closed and opening of the control valve 13 will cause the liquid to flow through line 11 directly to the feed pump 12.

Operation of the feed pump 12 will cause the liquid to flow through line 16 into the input port of a feed tank 17. The feed tank 17 is in fluid communication by means of line 18 with the liquid input port of a plate-type evaporator generally indicated by the reference numeral 19. A pump 20a is provided to insure proper fluid flow from the feed tank 17 to the evaporator 19. Pursuant to the invention, the plate-type evaporator 19 is arranged to include a novel configuration of fluid passes to define the heating means, restrictive orifice flow path and tortuous flow path stripping means of the invention. The details of the structure and operation of the plate-type evaporator 19 will be fully described below.

Pursuant to the invention, as described above with respect to the schematic diagram of FIG. 1, the fluid flow exiting the plate-type evaporator through line 21 will be in the form of a high velocity vapor spray including finely atomized droplets of liquid suspended in a vapor phase continuum formed by the volatile components evaporated from the liquid product. The line 21 is in fluid communication with a conventional elbow-type separator 22. Referring now to FIG. 3, the line 21 is provided with a 90° bend outlet 23 whereby the high velocity fluid flow is discharged toward the lower portions of the separator 22. As this occurs, the fluid droplets will fall due to gravity while the vapor continuum will tend to rise toward the upper portions of the separator 22. Thus, the liquid will collect at the lower portion of the separator and may be drawn out of the separator through line 24. The rising vapor will pass through a screen element 25 which includes a plurality of generally circular openings 26. Each opening 26 is provided with a corrugated metal filler 27 whereby fluid droplets which may be entrapped in the rising vapor will condense against the surfaces of the filler, collect on such surfaces and then drip under the influence of gravity to the lower portions of the separator 22. The vapor will continue to rise toward the upper portions of the separator 22 and may be drawn out of the separator 22 through line 28.

Referring once again to FIG. 2, the line 28 is connected to a vacuum condenser 29 including a line 30 connected to an appropriate source of vacuum (not specifically illustrated). The condensate formed in the condenser 29 is drawn through line 31 to a decanter 32. To advantage, line 31 is provided with a control valve 33. The system illustrated in FIG. 2 is preferably utilized in connection with a liquid product wherein the stripped vapor includes volatile organic solvents which separate out of the water phase of the condensate. Accordingly, within the decanter 32, the water will separate out of the removed volatile organic components to form a two-layer liquid bath within the decanter including a layer of water 34 and a layer of the volatile organic components 35. The volatile organic components may be drawn out of the decanter 32 through line 36 and the water component of the liquid bath may be drawn out of the decanter 32 through line 37 which is connected to the outlet line 24 of the separator 22. In this manner, the liquid product is combined with the water from the decanter 32 and fed by means of a pump 38 through line 39 back to the product supply tank 10. By recombining the water components of the vapor with the liquid output from the separator 22, the system of the present invention minimizes the amount of condensate which must be drawn out of the system through line 36. The liquid returned to the product supply tank 10 may be processed further in a continuous batch recycle system. The total running time for a liquid being processed in the system according to the present invention, will be determined by the final minimal percentage of volatile components which may remain in the liquid or the final concentration of solids desired.

In accordance with a significant feature of the invention, the plate-type evaporator 19 is arranged to provide a novel pass configuration to define the heating means, restrictive orifice flow path and tortuous flow path stripping means. Generally, the plate-type evaporator 19 comprises a pair of end frame members 40, 41 which are spaced from one another and arranged to mount a pair of plate support rods 42, 43. The plate support rods 42, 43 engage and support a plurality of plates 44 mounted between end members 45, 46. A threaded compression rod 47 is mounted in frame 41 whereby the rod may be moved toward the plurality of plates 44 to apply a compressive force against the plurality of plates to maintain them in closely adjacent relation to one another. The end members 45, 46 are provided with fluid lines 48, 48a to provide a source of ingress and egress of a suitable heating medium, such as steam, as will appear. To advantage, the individual plates 44 and the plate support structures are commercially available.

Referring now to FIGS. 4 and 4A, there is illustrated in an exploded view a preferred arrangement for the plates 44. Plate 44(1) is provided with openings 50, 51 which are arranged to be in direct fluid communication with lines 48 and 18, respectively. As can be seen, each of the plates 44 is provided with an arrangement of fluid boundary gaskets, e.g., gasket 52 on plate 44(1). The gaskets serve to separate the plates from one another when the plates are mounted between the members 45, 46 and compressed by the compression means 49. Moreover, the configuration for each particular gasket will define a leak tight fluid flow passage in the spacing between two adjacent plates 44 caused by the positioning of the gaskets between the plates 44. In accordance with a feature of the preferred embodiment of the invention, the gaskets are utilized to define a series of flow paths for the liquid product to be stripped including several heated passages, a single restrictive orifice-forming passage and several series of parallel, unheated passages to act as the tortuous flow path stripping means.

As the liquid product flows from line 18 through opening 51 of the plate 44(1), the gasket 52 will prevent any of the liquid product from flowing down the surface of the plate 44(1). The liquid will therefore continue to plate 44(2) and likewise due to circular gasket 54 continue through opening 55 formed in plate 44(2) to plate 44(3). Plate 44(3) is provided with a gasket 56 which defines a fluid flow passage occupying a substantial portion of the volume between the plates 44(2) and 44(3) to provide fluid communication between the openings 57 and 58 formed in plate 44(3). Accordingly, at opening 57 of plate 44(3), the liquid fluid flow will divide with a portion thereof continuing through opening 57 and the remaining portion flowing down through a passageway defined by the gasket 56 to the opening 58. The portion of the liquid fluid flow continuing through opening 57 of plate 44(3) will flow through opening 59 of plate 44(4), due to the circular gasket 60, the plate 44(5). The plate 44(5) is provided with a gasket 61 which defines a fluid flow passage within the spacing between the plates 44(4) and 44(5) from the region of plate 44(5) opposite opening 59 of plate 44(4) down to opening 62 formed at the lower left hand corner of plate 44(5). At opening 62, that portion of the fluid flowing down the passageway defined by gasket 61 will recombine with the portion of the fluid flowing down the passage defined by gasket 56 on plate 44(3), which has flowed out of the opening 58 through opening 63 of plate 44(4) to opening 62 of plate 44(5). Opening 63 of plate 44(4) is provided with a circular gasket 64 to insure that the fluid flows directly through opening 63 to the opening 62. Thus, the entire liquid product fluid flow will recombine at opening 62 and continue through opening 62 to opening 65 formed at the lower left hand corner of plate 44(6). Opening 65 is encirled by a circular gasket 66 whereby the recombined liquid product fluid flow will continue past plate 44(6) to opening 67 of plate 44(7).

In review, up to the point of opening 67, the liquid product fluid flow has been subdivided into two substreams and recombined. The two substreams flow through the flow streams defined by gasket 56 between plates 44(2) and 44(3) and gasket 61 between plates 44(4) and 44(5). As should be understood from a review of FIG. 4, each substream flow passage occupies a substantial volume of the spacing between the adjacent plates. Due to the relatively thin thickness of each gasket relative to the surface area enclosed by the gasket of each of the confronting adjacent plates, each substream will be exposed to a large surface area of both adjacent plates relative to the volume of the liquid product enclosed within the spacing between the plates.

At opening 67 of plate 44(7), the liquid product flow will again subdivide with a portion thereof continuing to plate 44(8) and the remaining portion flowing through the spacing between the plates 44(6) and 44(7) in a flow path defined by the gasket 69 interposed between the plates 44(6) and 44(7). A circular gasket 70 positioned at the lower left hand corner of plate 44(8) surrounds an opening 71 formed through the plate 44(8). The portion of the liquid product fluid flow not flowing through the spacing between the plates 44(6) and 44(7) will flow from opening 67 through opening 71 to plate 44(9). A gasket 72 is arranged between the plates 44(8) and 44(9) whereby the portion of the liquid product fluid flow reaching plate 44(9) will flow through the spacing between plates 44(8) and 44(9) to an opening 73 formed in the upper right hand corner of plate 44(9). The substream of the liquid product fluid flow flowing between plates 44(6) and 44(7) will leave the spacing through hole 74 formed in the upper right hand corner of plate 44(7) and flow through opening 75 formed in plate 44(8) to hole 73 of plate 44(9) where the substream recombines with the fluid flow passing through the spacing between plates 44(8) and 44(9).

A circular gasket 76 is arranged around the opening 75 to insure that the substream of the liquid product fluid flow passing through opening 75 by-passes plate 44(8) and continues to opening 73 of plate 44(9). The recombined liquid product fluid flow leaving opening 73 of plate 44(9) will continue to opening 77 formed in the upper right hand corner of plate 44(10) and due to the circular gasket 78 flow to plate 44(11). A gasket 79 arranged between the plates 44(10) and 44(11) will cause the entire liquid product fluid flow to flow through the spacing between plates 44(10) and 44(11) in a fluid flow passage defined by the configuration of the gasket 79. The liquid product fluid flow will leave the spacing between plates 44(10) and 44(11) through opening 80 formed in the lower left hand corner of plate 44(11) and pass through openings 81, 82 formed in the lower left hand corners of plates 44(12) and 44(13), respectively, to opening 83 formed in the lower left hand corner of plate 44(14). It should be understood, that each of the openings 81 and 82 are provided with a circular gasket 84, 85, respectively.

Referring now to the lower right hand corner of FIG. 4A, it can be seen that a heating fluid from line 48a flows from the line 48a to opening 86 formed in the lower right hand corner of plate 44(34). As discussed above, lines 48a and 48 are connected to a source of heating fluid (not specifically illustrated) as, for example, steam in a well known manner. The heating fluid entering opening 86 in plate 44(34) will continue to flow in the upstream direction relative to the flow of the liquid product past plates 44(33) to 44(13) through the openings 87 to 107 formed in the lower right hand corner of each of plates 44(33) to 44(13), respectively. Of course, to insure a straight flow of the heating fluid past the plates 44(34) to 44(13) each of the openings 86 to 107 is provided with an appropriate circular gasket 108 to 129.

Upon reaching opening 130 formed in the lower right hand corner of plate 44(12), the heating medium fluid flow will begin a subdivision into six separate substreams as follows. The gaskets 131 to 136 are arranged between plates 44(11), 44(12); 44(9), 44(10); 44(7), 44(8); 44(5), 44(6); 44(3), 44(4); and 44(1), 44(2), respectively, and define a heating medium flow passage between each of the aforementioned pairs of plates from openings 130, and 137 to 141 formed in the lower right hand corner of each of plates 44(12), 44(10), 44(8), 44(6), 44(4), and 44(2), respectively, to openings 142 to 146 formed in the upper left hand corner of each of the same set of plates. A portion of the heating medium fluid flow arriving at opening 130 of plate 44(12) will flow through the fluid passage defined by gasket 131 with the remaining portion of the heating medium fluid flow continuing past the opening 147, circular gasket 148 of plate 44(11) to the opening 137 formed in plate 44(10). At opening 137, a further substream of the heating medium fluid flow will flow up through the fluid passage defined by the gasket 132 with the remaining portion of the heating medium continuing past the opening 149, circular gasket 150, arrangement of plate 44(9) to opening 138 of plate 44(8). The subdividing of the heating medium fluid flow will continue at plates 44(8), 44(6), 44(4), and 44(2) through the fluid flow passages defined by the gaskets 133, 134, 135 and 136 substantially as described with respect to plates 44(12) and 44(10).

Of course, the opening circular, gasket arrangements 151, 152; 153, 154; and 155, 156; arranged in the lower right hand corner of each of plates 44(7), 44(5), and 44(3), respectively, will insure that the heating medium fluid flow will by-pass each of plates 44(7), 44(5), 44(3) as the stream subdivides into the various heating medium fluid sub-passages. The heating medium substream flowing through the fluid passage defined between plates 44(11), 44(12) by the gasket 131 will continue through the opening 157, circular gasket 158 arrangement of plate 44(11) to opening 142 of plate 44(10) where it will be combined with the substream flowing between plates 44(9) and 44(10) in the flow passage defined by the gasket 132. Likewise, the recombining heating medium flow stream will by-pass each of plates 44(9), 44(7), 44(5), 44(3) by passing through the opening, circular gasket arrangements 159, 160; 161, 162; 163, 164; 165, 166 arranged in the upper left hand corner of each of plates 44(9), 44(7), 44(5), 44(3), respectively, and recombine with the substreams flowing through the flow passages defined by the gaskets 133, 134, 135 and 136 at the openings 143 to 146. At opening 146, all of the six heating medium fluid flow substreams will have combined with the main stream and may continue through opening 50 formed in the upper left hand corner of plate 44(1) to line 48 and thereafter back to the source of heating fluid (not specifically illustrated).

As should be understood from the above description and the illustration of FIG. 4, the heating medium substreams flowing between plate 44(11), 44(12); 44(9), 44(10); 44(7), 44(8); 44(5), 44(6); 44(3), 44(4); and 44(1), 44(2) flow on either side of and thereby enclose the various liquid product substreams flowing between plates 44(2), 44(3); 44(4), 44(5); 44(6), 44(7); 44(8), 44(9); and 44(10), 44(11). Inasmuch as each of the liquid product substreams comprise a relatively small volume of liquid product in relation to the total surface area of each plate to which the substream is exposed, there will be an excellent and rapid heat exchange between the heating medium substreams and the liquid product substreams through the shared flow passage walls defined by the plates 44. The rate of liquid product flow and heating medium flow as well as the heating medium temperature may be set at predetermined levels to provide heat addition to the liquid product flow sufficient to cause vaporization of the volatile components of the liquid product when the liquid product is flashed from the restrictive orifice flow path to the tortuous flow path stripping means, as will now be described.

Up until the point of plates 44(9) the liquid product flow stream has been subdivided twice, each time into two substreams and recombined twice. Moreover, as described above, each of the substreams of the liquid product flow has been allowed to pass between two substreams of heating medium flow to impart thermal energy to the liquid product substreams. The heated recombined liquid product flow leaving opening 73 of plate 44(9) continues to a single pass between plates 44(10) and 44(11) whereby the entire liquid product fluid flow passes between these plates through opening 80 and thereafter on to plates 44(14) to 44(19). As illustrated in FIGS. 4 and 4A, the gaskets 167 to 172 are arranged between plates 44(13), 44(14); 44(14), 44(15); 44(15), 44(16); 44(16), 44(17); 44(17), 44(18); and 44(18), 44(19), respectively, to define a set of six parallel flow passages between these set of plates. Thus, the heated liquid product flow stream passing through opening 82 of plate 44(13) will flow through the series of openings 83, 173 to 176 formed in the lower left hand corner of each of plates 44(14) through 44(18), respectively, with a portion of the fluid flow subdividing at each of the openings 83, 173 to 176 out of the main flow stream and passing through the substream flow passages defined by the gaskets 167 to 172. A series of openings 177 to 182 are formed in the upper right hand corner of each of plates 44(14) to 44(19) whereby each of the substreams of the heated liquid product fluid flow may leave the subpassage defined by the gaskets 167 to 172 and constantly be recombined with the other substreams until the entire heated fluid flow path is recombined and leaves opening 182 of plate 44(19). In this manner, the heated liquid product flow stream will pass through a single passage defined by gasket 79 between plates 44(10) and 44(11) and is thereby allowed to flash into the relatively larger volume defined by the six parallel flow passages defined by gaskets 167 to 172. This will permit a volume expansion of the heated liquid product whereby the heat added in the prior passages in the plates constituting the heating means will be converted to latent heat of evaporation. In this manner, the volatile components of the liquid product will rapidly vaporize forming a vapor continuum carrying the liquid product in the form of droplets.

Subsequent to the flow through the six parallel substreams, the recombined liquid product will flow from opening 182 through the opening 183, gasket 184 arranged in the upper right hand corner of plate 44(20) to the opening 185 of plate 44(21). Similar to the previous six parallel flow passage arrangement discussed above, the gaskets 186 to 191 define a second set of six parallel flow passages between the plates 44(20), 44(21); 44(21), 44(22); 44(22), 44(23); 44(23), 44(24); 44(24), 44(25); and 44(25), 44(26), respectively. In this instance, however, each substream will flow from an opening 185, 192 to 195 formed in the upper right hand corner of each of the plates 44(21) to 44(25), respectively, to an opening 196 to 201 formed in the lower left hand corner of each of the plates 44(21) to 44(26), respectively, whereby each substream will flow from the top of the substream flow passage to the bottom thereof in contrast to the previous set of parallel passages wherein each substream flowed from the bottom of each substream flow passage to the top thereof. Thus, the change of direction of flow for the liquid product will cause a turbulent flow to further induce vaporization of the volatile components of the liquid product. The recombined liquid product flow will pass from opening 201 arranged in the lower left hand corner of plate 44(26) through the opening 202, circular gasket 203 arrangement of plate 44(27) to opening 204 of plate 44(28). The liquid product flow stream will thereupon undergo a third passage through a set of six parallel substream flow passages to permit further vaporization of the volatile components.

As should be understood, the fluid flow reaching opening 204 will have undergone a considerable vaporization in the prior two sets of parallel flow passages whereby the fluid flow will consist of a vapor continuum supporting finely atomized droplets of the nearly fully stripped liquid product. The high degree of vaporization will result in a considerable volume expansion of the fluid flow. To accommodate this fluid expansion, the gaskets 205 to 210 arranged between the plates 44(27) to 44(33), as illustrated, will each enclose a fluid substream between a single inlet opening 204, 211 to 214 arranged in the lower left hand corner of each of plates 44(28) to 44(32), respectively, to two outlet openings 215, 216 to 227, 228 formed in the upper portions of each of plates 44(28) to 44(34), respectively. The fluid flow passing through openings 225, 226 will bypass plate 44(34) through openings 227, 228 due to the circular gaskets 229, 230 and flow into line 21 as illustrated in FIG. 2. As discussed above with respect to FIG. 2, the fluid flow exiting the plate-type evaporator 19 through line 21 will be in the form of a high velocity vapor spray including finely atomized droplets of liquid suspended in a vapor phase continuum formed by the volatile components originally contained in the liquid product. Line 21 is connected to the separator 22 and the fluid flow will be further processed as discussed above in the description of the overall system incorporating the teachings of the present invention.

To summarize the process undergone by the liquid product as it passes through the plate-type evaporator 19, reference is made to FIG. 5A which illustrates in schematic form the overall flow path followed by the liquid product. The plates of the plate-type evaporator are indicated by the vertical bars 344 while the liquid material flow path is indicated by the line 301 and the heating medium flow path by the line 302. The plate 344 configuration with respect to the liquid material flow path may be designated as 2—2—1—6—6—6.

In other words, the liquid material subdivides and flows through two heated substreams, recombines and once again subdivides into two further heated substreams, recombines to flow through a single heated, restrictive orifice-forming flow path between two of the plates 344 and continues on to subdivide and recombine three times through three consecutive sets of unheated passages with each set comprising six parallel liquid material substream flow passages. The various parallel liquid material flow passages of the 2—2—1—6—6—6 plate configuration are indicated in the margins above the schematic illustration of FIG. 5A. The 2—2 portion of the plate configuration comprises the heating means, the single one pass portion of the plate configuration comprises the restrictive orifice flow path and finally the 6—6—6 portion of the plate configuration comprises the tortuous flow path stripping means. The flow diagram depicted in FIG. 5A provides a clear graphic illustration of the basic teachings of the apparatus and method of the present invention. The heated passages of the plate configuration afford a highly effective heat exchange region whereby the liquid material flow may be imparted with a high degree of thermal energy necessary to achieve rapid and thorough vaporization of the volatile components contained therein. The single flow pass arranged between the 2—2 portion of the plate configuration and the 6—6—6 portion of the plate configuration forms a constriction in the fluid flow to maintain relatively high pressure conditions within the heated passages to prevent any vaporization from occurring therein while effecting a flashing of the liquid material as it passes from the 2—2 portion of the plate configuration to the 6—6—6 portion of the plate configuration.

Moreover, the constant subdividing and recombining of the liquid material flow in conjunction with the constantly changing direction of the liquid material flow from each set of six parallel flow passages to the next set of six parallel flow passages induces a highly turbulent fluid flow. This will further foster vaporization of the volatile components and force the remaining droplets of liquid material to experience a high degree of exposure to the vapor continuum formed by the vaporized volatile components. The vapor continuum will act as a stripping gas to further evaporate the volatile components from the droplets of the liquid material.

Depending on the particular liquid material to be stripped, and the degree of stripping which is desired, it has been found that several variations in the plate configuration enhance the stripping effectiveness of the invention. Referring now to FIGS. 5B and 5C, there is illustrated in schematic form two additional embodiments of the invention. In FIG. 5B, the plates are indicated by the reference numeral 444 while the liquid material fluid flow by the reference numeral 401 and the heating medium fluid flow by the reference numeral 402. As in the embodiment of the invention illustrated in FIG. 5A, there are two heated passages for the liquid material fluid flow followed by an additional two heated passages and a single restrictive orifice-forming path. Thereafter, the liquid product flows through three sets of unheated parallel flow passages with the first set including six parallel passages, the second set including eight parallel passages, and the third set including ten parallel passages to form a 2—2—1—6—8—10 plate configuration. The additional flow passages provided in each downstream set of parallel unheated passages accommodates greater volume expansion as the volatile components of the liquid material being processed vaporize to form the vapor continuum.

In the embodiment of the invention illustrated in FIG. 5C, the plates of the evaporator are arranged in a 2—2—1—10—11—12 configuration to provide even greater volume expansion and retention time for the vaporizing volatile components. In FIG. 5C, the plates are indicated by the reference numeral 544 while the liquid is indicated by 501 and the heating medium by 502. Moreover, it has been found that when either the 6—8—10 or the 10—11—12 plate configuration is utilized for the unheated stripping section, a very efficient evaporation operation is obtained resulting in an almost complete vaporization of the volatile components occurring within the stripping section with only a very minute fraction taking place in the separator. The only flashing occurring in the separator results from the very slight pressure drop occurring at the inlet portion of the separator. Accordingly, a smaller size separator may be used.

Of course, additional plate configurations may be utilized depending on the particular characteristics of the liquid to be processed. What is critical is the step of flashing the liquid into a tortuous flow path stripping section of predetermined dimensions whereby there is sufficient time for the generation of vapor, production of mist to carry the liquid droplets and adequate evaporation of the volatile components. In some instances, it has been found advantageous to inject air or some inert gas into the liquid material prior to its passage through the tortuous flow path stripping section. The injection of the air will increase the partial pressure of the solvent to be removed to facilitate a more thorough stripping of the product, especially in instances where the liquid product initially contains a relatively small amount of volatile components. An inert gas would be used in place of air if the liquid product being processed was susceptible to degradation through oxidation.

In other instances, the content of water, organic solvents or other volatile components in the liquid material may constitute a relatively small amount of the liquid material whereby the vaporization of these fluids does not form a vapor mist capable of atomizing the remaining liquid into droplet form. In such a case, water, organic solvents or other volatile components may be added to the original batch of liquid material to be processed to obtain an adequate proportion of these components. Accordingly, upon flashing of the liquid material into the tortuous flow path stripping section, there will be sufficient vapor formed to atomize the liquid and to act as a stripping agent.

Referring now to FIG. 6, there is illustrated another system incorporating a plate-type evaporator arranged in accordance with the present invention. In the system of FIG. 6, all of the various components of the system are essentially similar to a system illustrated in FIG. 2. The significant difference lies in the arrangement of the outlet line 24' of the separator 22' which is arranged to form a feedback loop to circulate the stripped liquid output from the separator 22' to the inlet line 18' of the plate-type evaporator 19' to provide a "pack recycle" arrangement for the system. This system is advantageous when the liquid product being processed is not shear sensitive and a low residual volatile content is required. The particular system utilized for carrying out the process of the invention will depend upon the particular liquid product being stripped. Indeed, there are certain products which may be adequately stripped or concentrated after a single pass through the plate-type evaporator 19.

The utility of the above-described invention is illustrated by the following examples:

EXAMPLE 1

A water dispersed cationic resin including 12.91% methyl isobutyl ketone was processed in a batch recycle system including a plate-type evaporator having a 2—2—1—6—8—10 plate configuration. The liquid product was run through the system for a period of 4¼ hours. The results of the test run are set forth below:

|  | 1 |
| --- | --- |
| Duration - hrs. | 4¼ |
| Steam Pressure - # ga. | 8 (235° F.) |
| Abs. Pressure in Separator - mm Hg. Abs. | 54 mm |
| Vapor Temp. of Overhead Vapor at condenser | 104° F. |
| Avg. Temp. of Liquid at Inlet to Plate Pak (Feed) | 212° F. |
| Avg. Temp. of Liquid at Inlet to Restrictive Plate | 218°–220° F. |
| Avg. Temp. of Liquid at Outlet of Restriction Plate after flashing | 168° C. |
| Avg. Temp. of Liquid/Vapor Mixture at Center Stripping Section | 146° F. |
| Avg. Temp. of Liquid/Vapor Mixture at Outlet | 104° F. |
| Avg. Total Vapor Mixture Overhead | 56 #/hr. |
| Avg. Feed Volume in Batch Tank | 50 gals (417 #) |
| Recycle Rate = (8.25 #/Min. × 60) = | 495 #/hr. |
| Number of Times Batch turned over | 5.04 |
| TOTAL VOLATILES IN FEED | 65.2% |
| WATER IN FEED | 52.29% |
| METHYL ISOBUTYL KETONE SOLVENT IN FEED | 12.91% |
| RESIN CONCENTRATION FROM STRIPPER (TOTAL SOLIDS) | 46% |
| FEED CONCENTRATION (TOTAL SOLIDS) | 34.8% |
| CONCENTRATION OF RESIN IN FINISHED BATCH (TOTAL SOLIDS) | 42% |
| METHYL ISOBUTYL KETONE SOLVENT IN FINISHED BATCH LESS THAN | 0.2% |

As indicated, the process of the invention reduced the amount of methyl isobutyl ketone in the liquid from an initial concentration of 12.91% to a final concentration of less than 0.2%.

EXAMPLES 2 AND 3

To illustrate the consistency of excellent results obtained in carrying out the steps of the invention, additional samples of water dispersed cationic resin including an initial concentration of organic solvent of over 12% were run through a 2—2—1—6—8—10 plate configuration arranged in a batch recycle system. The following chart sets forth the results:

|  | 2 | 3 |
| --- | --- | --- |
| Duration - hrs. | 4 | 5¼ |
| Steam Pressure - #ga. | 12 (243° F.) | 10 (240° F.) |
| Abs. Pressure in Separator - mm Hg. Abs. | 57 mm | 52 mm |
| Vapor Temp. of Overhead Vapor at condenser | 105° F. | 103° F. |
| Avg. Temp. of Liquid at Inlet to Plate Pak (Feed) | 211° F. | 217° F. |
| Avg. Temp. of Liquid at Inlet to Restrictive Plate | 218°–220° F. | 218°–220° F. |
| Avg. Temp. of Liquid at Outlet of Restriction Plate after flashing | 174° F. | 170° F. |
| Avg. of Temp. of Liquid/Vapor Mixture at Center Stripping Section | 151° F. | 148° F. |
| Avg. Temp. of Liquid/Vapor Mixture at Outlet | 105° F. | 105° F. |
| Avg. Total Vapor Mixture Overhead | 71 #/hr. | 59 #/hr. |
| Avg. Feed Volume in Batch Tank | 49 gals (412 #) | 50 gals (415 #) |
| Recycle Rate = (#/Min. × 60) = | (8.8 × 60) = 528 #/hr. | (8.7 × 60) = 522 #/hr. |
| Number of Times Batch turned over | 4.93 | 6.4 |
| TOTAL VOLATILES IN FEED | 66% | 61.2% |
| WATER IN FEED | 53.09% | 48.29% |
| METHYL ISOBUTYL KETONE SOLVENT IN FEED | 12.91% | 12.91% |

|  | -continued | |
| --- | --- | --- |
|  | 2 | 3 |
| RESIN CONCENTRATION FROM STRIPPER (TOTAL SOLIDS) | 46.5% | 44.5% |
| FEED CONCENTRATION (TOTAL SOLIDS) | 34% | 38.8% |
| CONCENTRATON OF RESIN IN FINISHED BATCH (TOTAL SOLIDS) | 41.8% | 39.7% |
| METHYL ISOBUTYL KETONE SOLVENT IN FINISHED BATCH LESS THAN | 0.2% | 0.2% |

As in the results of the test run of Example 1, the amount of methyl isobutyl ketone in the feed material was greatly reduced. It should also be noted that the average temperature change of the liquid from the inlet to the plate pack to the inlet of the restrictive orifice-forming single pass of the plate pack was in the 6°–9° F. range. Accordingly, pursuant to the teaching of the present invention, it is possible to maintain the pressure and velocity conditions of the liquid material as it passes through the heating means whereby sufficient heat is added to the liquid material to effect substantial vaporization of the volatile components upon flashing with a rather minimal increase in the temperature of the liquid during its passage through the heating means. Therefore, the stripping operation may be performed on heat-sensitive liquid materials while greatly minimizing the risk of damage to the liquid material due to the addition of heat.

Thus, the present invention provides the art with a highly effective process and apparatus for evaporating volatile components from a liquid material. A substantial removal of volatile components is achieved pursuant to the novel step of flashing the heated liquid material into a confined passageway having a predetermined configuration to impart a turbulent fluid flow and continuing to pass the liquid material through the confined passageway under time, pressure and temperature conditions whereby the vaporized volatile components carry the liquid material in atomized droplet form and continuously turbulently evaporate the remaining volatile components from the liquid droplets within and throughout the confined passageway. As indicated by the above results of test runs of the disclosed process steps on a prototype of the apparatus of the invention, the present inventive concept has proven to be capable of significant practical application.

As discussed above, the more specific operating parameters of the invention will be determined by the particular characteristics of the actual liquid product to be processed, the amount of evaporation to be effected on the volatile components or concentration of the solid components of such liquid product, as well as the sheer tolerance, thermal stability and foaming characteristics of the specific liquid material being processed.

It should be understood, of course, that the illustrated form of the invention is intended to be representative only, as certain changes may be made therein by those skilled in the art without departing from the clear teachings of the disclosure. Accordingly, reference should be made to the following appended claims in determining the full scope of the invention.

We claim:

1. A process for removing volatile components from a liquid material comprising the steps of
    (a) heating the liquid material in the absence of a stripping gas,
    (b) maintaining the pressure and temperature of the liquid material during the heating step at predetermined levels to prevent any vaporization of the volatile components from occurring during the heating of the liquid material,
    (c) after heating the liquid material, continuously passing the liquid material directly through a restrictive orifice forming flow path,
    (d) immediately thereafter passing the liquid material directly into a relatively elongated, narrow confined passage having a high ratio of surface area to volume of fluid flow and a predetermined configuration to impart a turbulent flow to the liquid material,
    (e) maintaining the pressure and velocity conditions of the liquid material flow within said passage whereby said conditions, relative to such conditions existing during the heating of the liquid material, will cause the majority of the volatile components of the liquid material to, substantially instantaneously vaporize in a flashing action as the liquid material passes from the restrictive orifice forming flow path to said passage,
    (f) continuing to pass the liquid material and vaporized volatile components as a homogeneous mixture in turbulent flow through said passage whereby the vaporized volatile components continue to flow as a high velocity vapor continuum carrying said liquid material in atomized droplet form and subjecting said liquid droplets to a turbulent stripping action to remove the remaining volatile components therefrom, and
    (g) passing the high velocity vapor contiuum-liquid droplet flow into a liquid-vapor separator.

2. The process according to claim 1, further characterized by maintaining said elongated, narrow passage as an unheated fluid flow passage.

3. The process according to claim 1, wherein the liquid material is heated by an external heat source.

4. The process according to claim 3, further characterized by utilizing steam as said external heat source.

5. A process for removing volatile components from a liquid material, comprising the steps of
    (a) passing said liquid material through a confined passageway,
    (b) heating said liquid material within a first predetermined portion of said confined passageway under pressure and temperature conditions whereby the volatile components of said liquid material are maintained below the boiling point for said volatile components,
    (c) continuously passing said liquid material from said first predetermined portion of the confined passageway into and through a second predetermined portion of said confined passageway, (d) arranging said second predetermined portion of said confined passageway to form a partial restriction to fluid flow, (e) immediately passing said liquid material from said second predetermined portion of the confined passageway to a third predetermined portion of said confined passageway, (f) arranging said third predetermined portion of said confined passageway to provide a relatively elongated, narrow passage having a high ratio of surface area to volume of fluid flow and a predetermined configuration to impart a turbulent flow to the liquid material, (g) maintaining the pressure and velocity conditions of the liquid material flow within said third predetermined portion of said confined passageway whereby said conditions, relative to such conditions existing within the first predetermined portion of said passageway, will cause the majority of the volatile components of the liquid material to substantially instantaneously vaporize in a flashing action as the liquid material passes from the first predetermined portion of the confined passageway through the partial restriction defined by the second predetermined portion of the confined passageway and into the third predetermined portion of the confined passageway whereby the vaporized volatile components form a high velocity vapor flow carrying said liquid material in atomized droplet form, (h) continuing to pass said high velocity vapor flow through said third predetermined portion of the confined passageway under time, pressure and temperature conditions whereby said vaporized volatile components act to turbulently strip the remaining volatile components from the liquid droplets turbulently carried by said vapor flow in high velocity flow throughout the third predetermined portion of the confined passageway.

6. The process according to claim 5, further characterized by passing said vaporized volatile components and the liquid droplets carried thereby from said confined passageway to a liquid-vapor separator.

7. The process according to claim 6, further characterized by utilizing said liquid-vapor separator to separate said liquid droplets from said vaporized volatile components.

8. The process according to claim 7, further characterized by re-passing the liquid material removed from said vaporized volatile components through said confined passageway.

9. The process according to claim 8, further characterized by
(a) condensing said vaporized volatile components,
(b) permitting the immiscible phases of the condensate formed from said vaporized volatile components to separate out from one another,
(c) combining certain, pre-selected ones of said immiscible phases with the liquid material separated from the vaporized volatile components by said liquid-vapor separator.

10. The process according to claim 8, further characterized by passing said removed liquid material directly to said confined passageway.

11. The process according to claim 5, further characterized by adding a gas to the liquid material prior to passing said liquid material through the third predetermined portion of said confined passageway.

12. The process according to claim 5 wherein said liquid material is a heat sensitive liquid material.

13. The process according to claim 5 wherein said liquid material is a liquid material having foaming characteristics.

* * * * *